(12) United States Patent
Spotswood

(10) Patent No.: US 7,631,057 B2
(45) Date of Patent: Dec. 8, 2009

(54) TWO-PHASE DEPLOYMENT FRAMEWORK

(75) Inventor: Mark Spotswood, Newton Center, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 347 days.

(21) Appl. No.: 11/469,772

(22) Filed: Sep. 1, 2006

(65) Prior Publication Data

US 2007/0250831 A1  Oct. 25, 2007

Related U.S. Application Data

(60) Provisional application No. 60/794,243, filed on Apr. 21, 2006.

(51) Int. Cl.
G06F 15/177 (2006.01)
G06F 15/16 (2006.01)
G06F 12/00 (2006.01)
G06F 17/30 (2006.01)

(52) U.S. Cl. .................. 709/220; 707/201; 709/217

(58) Field of Classification Search ................ 709/217, 709/220; 707/201
See application file for complete search history.

(56) References Cited

U.S. PATENT DOCUMENTS

| 5,261,089 | A | * | 11/1993 | Coleman et al. ............... 707/8 |
| 6,363,401 | B2 | * | 3/2002 | Yahya et al. .................. 707/202 |
| 2002/0091784 | A1 | | 7/2002 | Baker et al. |
| 2003/0158955 | A1 | * | 8/2003 | Minear et al. ................ 709/230 |
| 2003/0163801 | A1 | | 8/2003 | Thames et al. |
| 2004/0025079 | A1 | | 2/2004 | Srinivasan et al. |
| 2005/0050137 | A1 | | 3/2005 | Bodin et al. |

OTHER PUBLICATIONS

International Search Report for PCT/US07/60106 dated Oct. 26, 2007, 9 pages.

* cited by examiner

Primary Examiner—George C Neurauter, Jr.
(74) Attorney, Agent, or Firm—Fliesler Meyer LLP

(57) ABSTRACT

A two-phase deployment framework can allow multiple types of components to register and be part of a two-phase deployment.

7 Claims, 8 Drawing Sheets

TWO-PHASE DEPLOYMENT FRAMEWORK

CLAIM OF PRIORITY

This application claims priority to U.S. Provisional Application No. 60/794,243 entitled "Two-phase Deployment Framework" filed Apr. 21, 2006, which is incorporated herein by reference.

BACKGROUND OF INVENTION

Systems for complex applications can be run off of multiple server machines. Changes can be deployed to the multiple server machines at the same time so that each machine has the same setup. It is desired that the changes to the servers be done in a two-phase manner such that the changes can be rolled back if not all of the servers are able to commit the changes.

DETAILED DESCRIPTION

Figure 1:
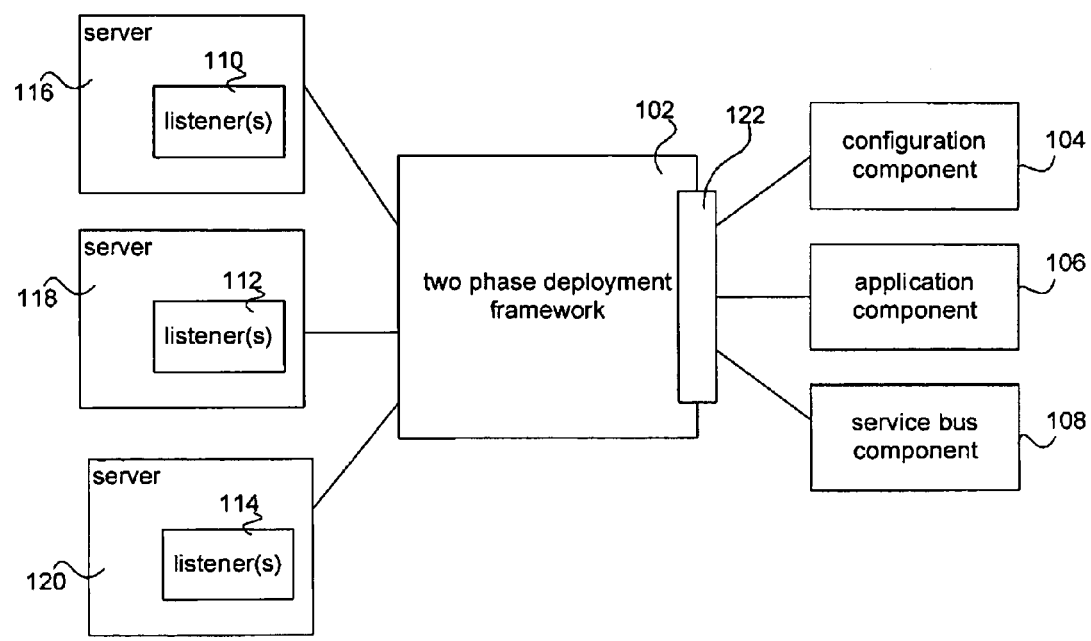
FIG. 1 is an example of a two-phase deployment framework of one embodiment of the present invention.

FIG. 1 shows a two-phase deployment framework 102. Components, such as configuration components 104, application components 106 and service bus component 108, can register with the two-phase deployment framework 102 to do two-phase deployment of different types of objects. The components can include listeners 110, 112 and 114 at different machines 116, 118 and 120. The system can do a two-phase deployment including the different type of objects.

Figure 2A:
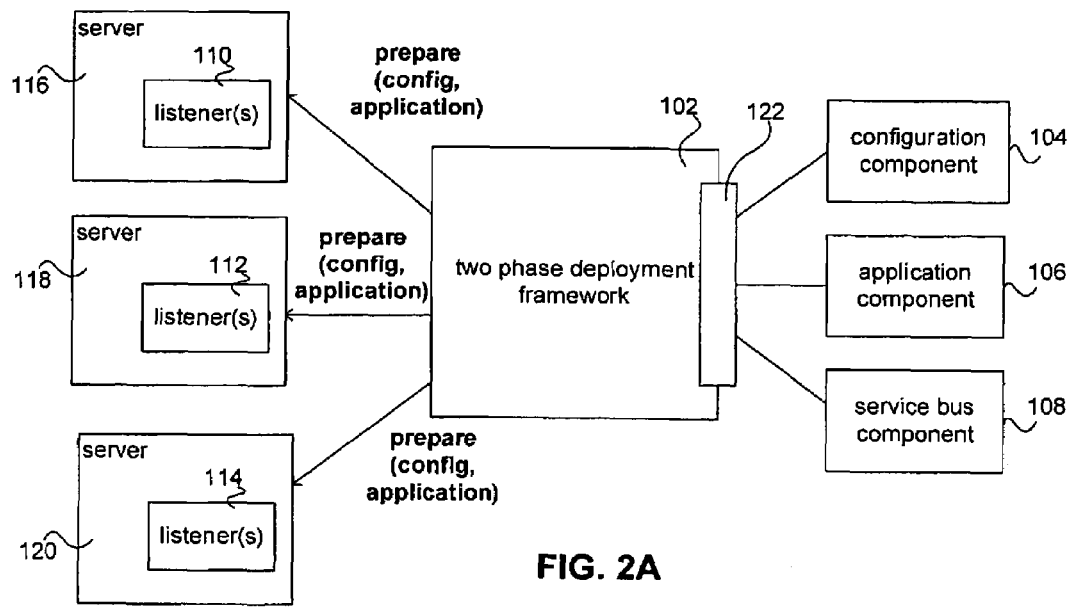
FIGS. 2A-2C illustrate a two-phase commit.
Figure 2B:
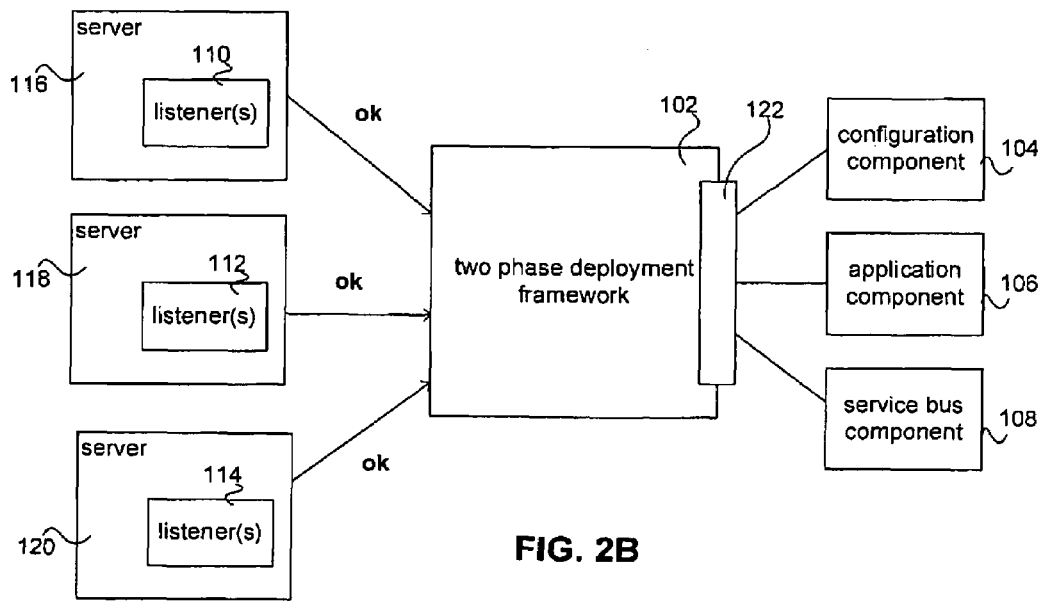
Figure 2C:
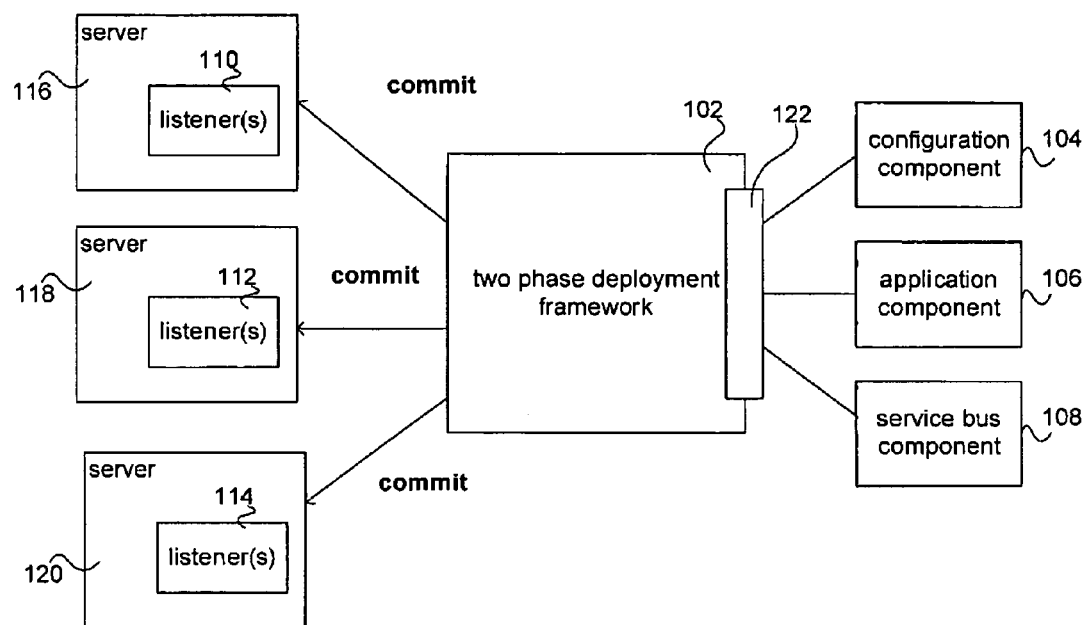

FIGS. 2A-2C show an example of a two-phase commit operation. In FIG. 2A, the framework 102 sends prepare messages to the machines 116, 118 and 120. The prepare message in this example concerns two types of objects, configuration and applications. The prepare message can include or be associated with change to the conformation and application. The listeners can determine whether the changes can be committed by the machine. For example, a config listener can check to see whether the match can set the new config. In FIG. 2A, an OK (ready) message is sent by all the machines. In FIG. 2C the two-phase deployment framework 102 sends a commit message to each of the machines and the changes are committed.

Figure 3A:
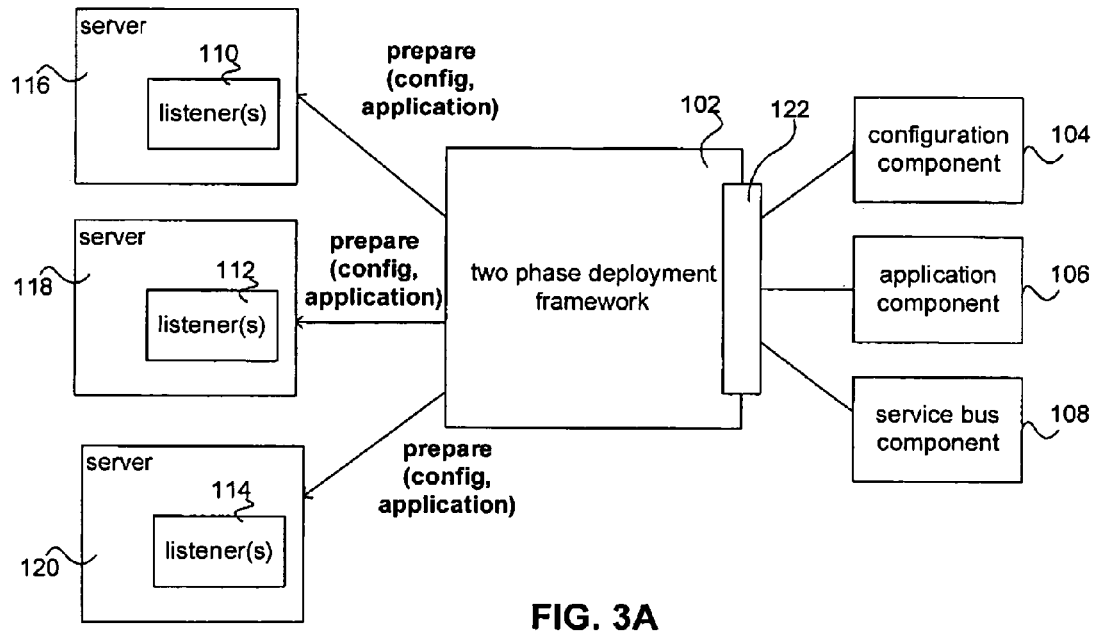
FIGS. 3A-3C illustrate a two-phase rollback.
Figure 3B:
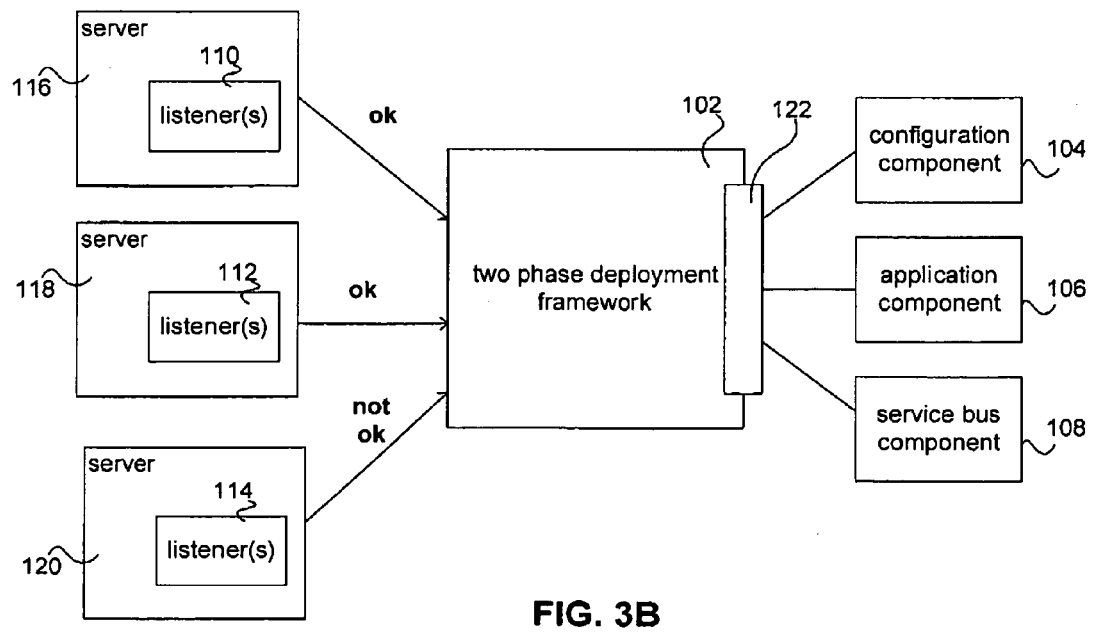
Figure 3C:
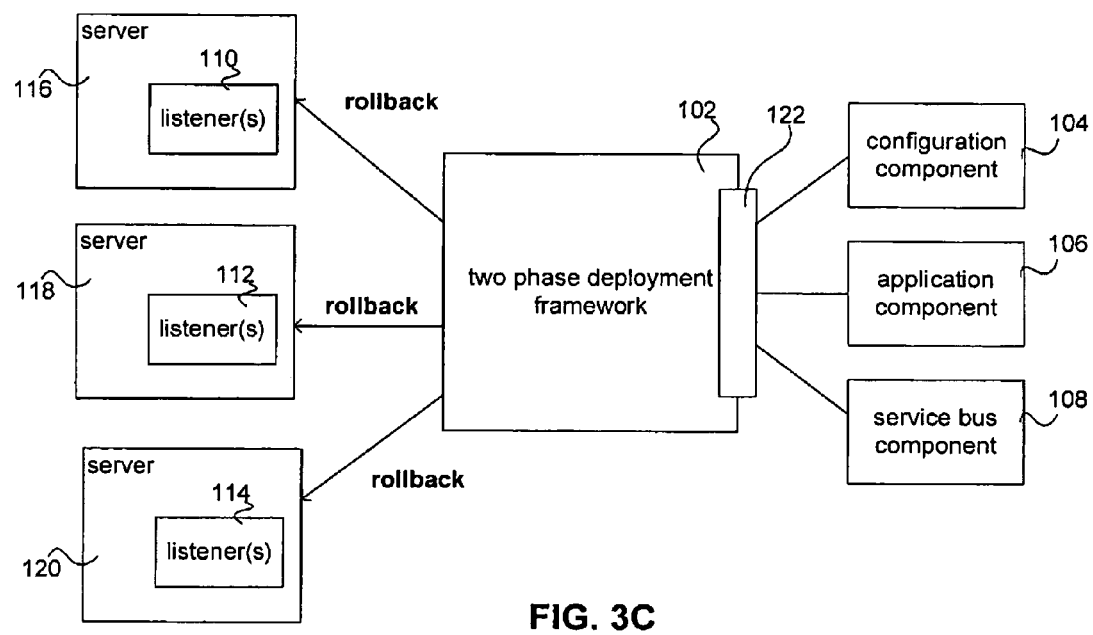

FIGS. 3A-3B show a rollback. In step 3A, prepare messages are sent to each of the machines. In step 3B, machine 120 responds with a NOT OK, or doesn't respond at all. In step 3C, the two-phase deployment framework 102 sends rollback message to machines 116, 118 and 120.

The use of the two-phase deployment framework 102 also allows new types of objects to be added to the two-phase system by registering with the framework and adding a listener. The listener can do what is needed to operate in a two-phase manner with respect to that type of objects. The two-phase deployment framework 102 can include an interface 122 for allowing new components to register with the framework 102.

Figure 4:
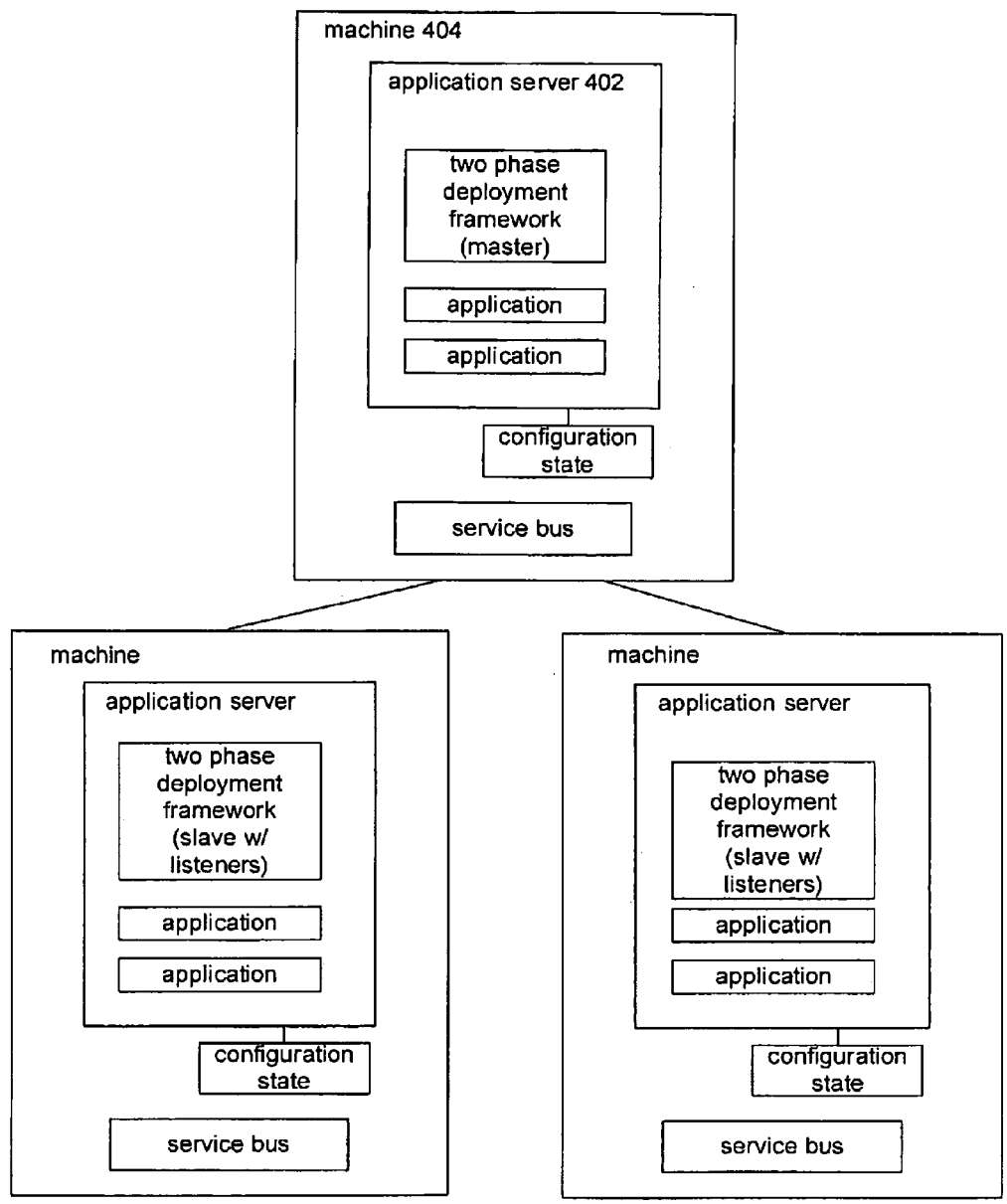
FIG. 4 illustrates a two-phase deployment framework used with an application server.

FIG. 4 shows an example of the two-phase deployment framework used with an application server. Application server 402 on machine 404 can serve as the master. The components can include configuration for the application servers and application, to run on the application server. For example, in one case, the configuration is to be changed to accommodate a new application to run on the machines. The two-phase deployment framework, allows the configuration and the new application to be loaded as an atomic unit.

One embodiment of the present invention comprises a two-phase deployment of configuration for an application server 402. The configuration is sent to each machine. Each machine sending a ready indication, such as an OK message, once the configuration is reached. The system can then commit the application server configuration change.

The new configuration can be transferred as an enterprise bean and maintained as a file at each machine.

Figure 5A:
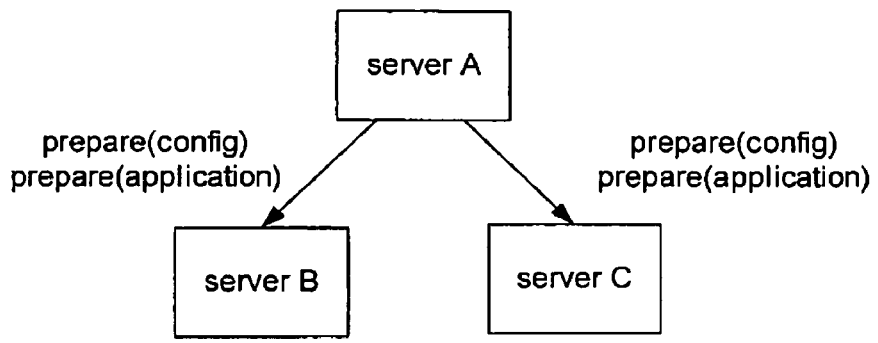
FIGS. 5A-5C illustrates a two-segment two-phase deployment.
Figure 5B:
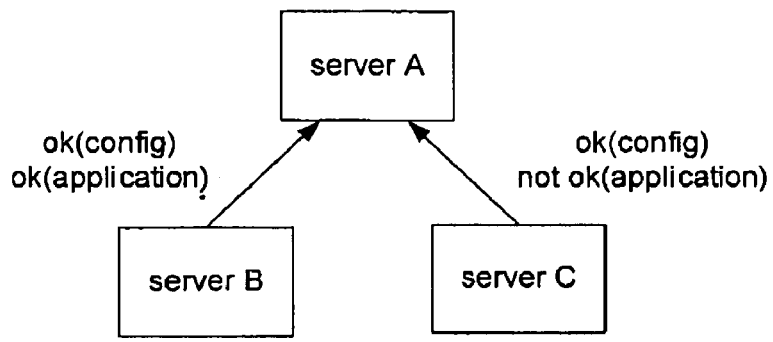
Figure 5C:
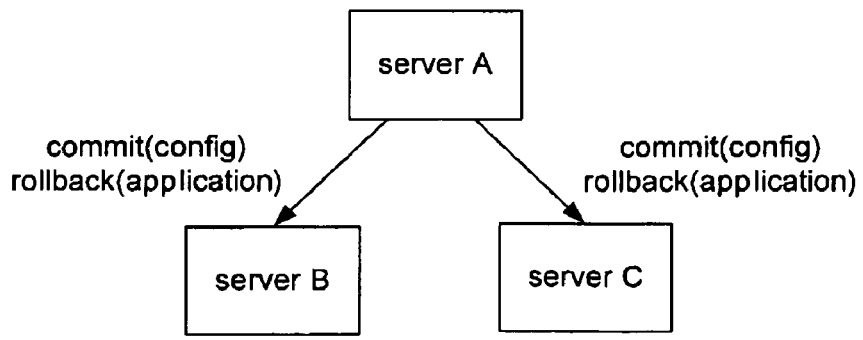
Figure 6A:
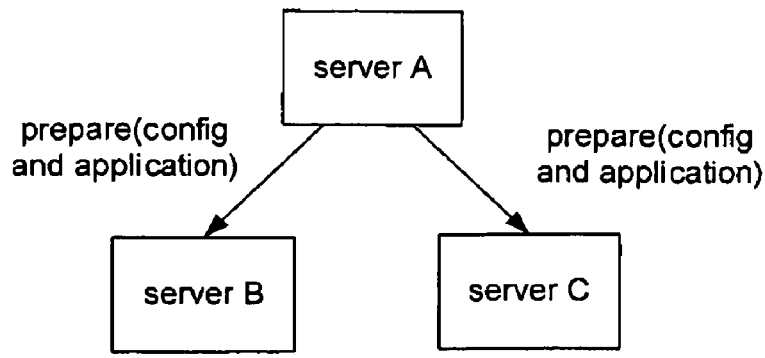
FIGS. 6A-6C illustrates a combined two-phase deployment.

The two-phase deployment framework can allow multiple types of objects to be used in the two-phase deployment. If instead of using a two-phase deployment framework, there were multiple two-phase systems, one for each type of objects, then one object could commit when the other has rolled back. FIGS. 5A-5C illustrate this problem of two-phase deployment systems that do not interact. This problem is avoided in the combined system of FIGS. 6A-6C that uses a two-phase deployment framework.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system comprising:
   a two phase deployment framework; and
   components registering with the two phase deployment framework to do a two phase deployment of different types of objects, the components including listeners at different machines, wherein the two phase deployment framework does two phase deployment including the different types of objects;
   wherein the components include a service bus deployment component and associated listener for deploying a service bus configuration for a service bus and an application server deployment component and associated listener for deploying an application server configuration for an application server;
   wherein a single two phase deployment can include both application server configuration and service bus configuration such that both the application server configuration and service bus configuration are either loaded to multiple machines or rolled back as a group; and
   wherein the system includes at least one processor.

2. The system of claim 1, wherein the two phase deployment framework includes an interface that the component can use to register with the framework.

3. The system of claim 1, wherein the two-phase deployment includes a prepare and a commit phase.

4. A system comprising:
   a configuration being sent to a number of machines in a two phase deployment, each of the number of machines returning a ready indication once the configuration is prepared, and once each of the number of machines is prepared, the system commits the configuration change;
   wherein the configuration includes a service bus configuration for a service bus and an application server configuration for an application server;
   components including a service bus deployment component and associated listener for deploying the service bus configuration and an application server deployment component and associated listener for deploying the application server configuration;
   wherein a single two phase deployment can include both the application server configuration and the service bus configuration such that both the application server configuration and service bus configuration are either loaded to the number of machines or rolled back as a group; and
   wherein the system includes at least one processor.

5. The system of claim 4, wherein the system includes a two-phase deployment framework and components that register with the two-phase deployment framework.

6. The system of claim 4, wherein the two-phase deployment includes a prepare and a commit phase.

7. The system of claim 4, wherein the configuration is maintained as a file at each of the number of machines.

* * * * *

UNITED STATES PATENT AND TRADEMARK OFFICE
CERTIFICATE OF CORRECTION

PATENT NO.         : 7,631,057 B2                                               Page 1 of 1
APPLICATION NO. : 11/469772
DATED              : December 8, 2009
INVENTOR(S)        : Mark Spotswood It is certified that error appears in the above-identified patent and that said Letters Patent is hereby corrected as shown below:

Title page, item (*) Notice:    should read as follows:  Subject to any disclaimer, the term of this patent is extended or adjusted under 35 U.S.C. 154(b) by 445 days.

Figure 6B:
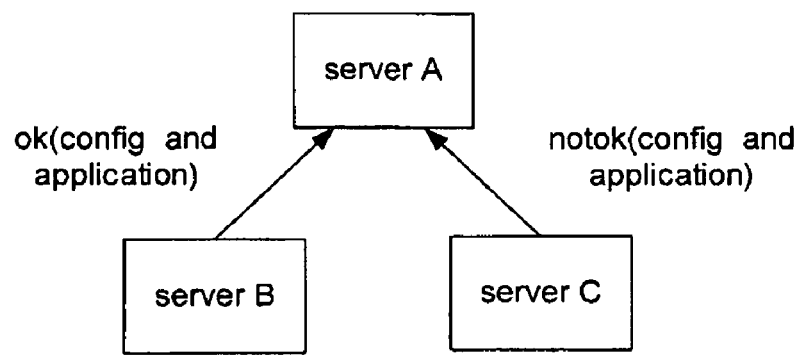

On sheet 8 of 8, in Figure 6B, line 2, delete "notok" and insert -- not ok --, therefor.

Figure 6C:
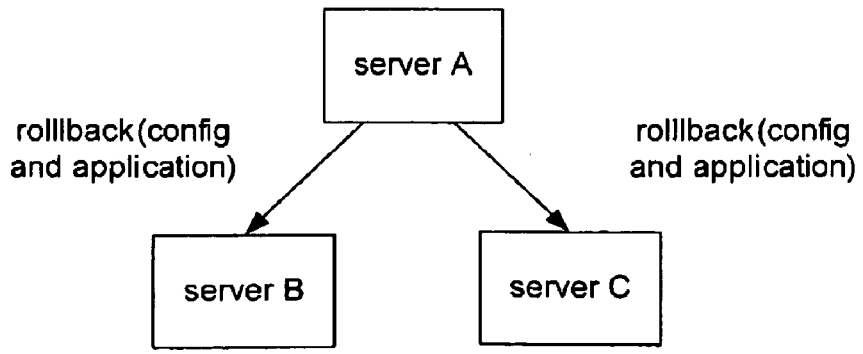

On sheet 8 of 8, in Figure 6C, Above Server B, line 2, delete "rolllback" and insert -- rollback --, therefor.

On sheet 8 of 8, in Figure 6C, Above Server C, line 2, delete "rolllback" and insert -- rollback --, therefor.

In column 2, line 11, delete "framework," and insert -- framework --, therefor.

In column 2, line 47-48, delete "Rams, EPROM's, EPROM's, Drams, Rams," and insert -- RAMs, EPROM's, EEPROM's, DRAMs, RAMs, --, therefor.

Signed and Sealed this

Fourteenth Day of September, 2010

David J. Kappos
*Director of the United States Patent and Trademark Office*